United States Patent
Cohoon

(10) Patent No.: US 9,547,729 B2
(45) Date of Patent: *Jan. 17, 2017

(54) ADAPTIVE QUERY PROCESSOR FOR QUERY SYSTEMS WITH LIMITED CAPABILITIES

(71) Applicant: International Business Machines Corporation, Armonk, NY (US)

(72) Inventor: Stephen M. Cohoon, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 294 days.

This patent is subject to a terminal disclaimer.

(21) Appl. No.: 14/291,661

(22) Filed: May 30, 2014

(65) Prior Publication Data

US 2015/0347588 A1 Dec. 3, 2015

(51) Int. Cl.
*G06F 17/30* (2006.01)

(52) U.S. Cl.
CPC ... *G06F 17/30979* (2013.01); *G06F 17/30395* (2013.01); *G06F 17/30867* (2013.01)

(58) Field of Classification Search
None
See application file for complete search history.

(56) References Cited

U.S. PATENT DOCUMENTS

| | | | |
|---|---|---|---|
| 7,103,588 B2 | 9/2006 | Beck et al. | |
| 8,433,705 B1* | 4/2013 | Dredze | G06F 17/3053 707/723 |
| 8,706,756 B2* | 4/2014 | Wu | G06F 17/30545 707/770 |
| 2005/0076024 A1* | 4/2005 | Takatsuka | G06F 17/30286 |
| 2012/0216125 A1* | 8/2012 | Pierce | G06Q 10/103 715/744 |
| 2013/0054639 A1* | 2/2013 | Sharma | G06F 17/3007 707/770 |
| 2015/0278902 A1* | 10/2015 | Warren | G06Q 30/0623 705/26.61 |

FOREIGN PATENT DOCUMENTS

EP   2085897   8/2009

OTHER PUBLICATIONS

List of IBM Patents or Patent Applications to be Treated as Related.
Non-Final Office Action dated May 19, 2016, received for U.S. Appl. No. 14/604,794.

* cited by examiner

*Primary Examiner* — Bai D. Vu
(74) *Attorney, Agent, or Firm* — Fleit Gibbons Gutman Bongini Bianco PL; Jon A. Gibbons

(57) ABSTRACT

A query processor determines if an initial query results in a query system having a search engine coupled to a database to identify a limited maximum number of records deliverable by the query system. This limitation is indicative of an incomplete result because records are includable in the query may not be included in the result. In response the query processor generates a plurality of queries that cause the query system to generate results that identify less than the maximum number. The results of the plurality of queries are combined as a response to the initial query. Duplicate records caused by any overlap in the plurality of queries may be eliminated from the combination. Determining a median value of a query range that causes the query system to deliver the maximum number of records may be utilized in the generation of the plurality of queries.

9 Claims, 6 Drawing Sheets

ADAPTIVE QUERY PROCESSOR FOR QUERY SYSTEMS WITH LIMITED CAPABILITIES

BACKGROUND

This disclosure broadly relates to the field of query processing, and more particularly to the field of adapting a query to enhance results produced by a limited capability query system.

Systems for searching databases with queries has grown with the growth of the Internet and the advent of cloud based services. A query may be generated by a client user and sent to any of several query systems by a query processor. The results of the query are then returned to the client user. Each query system may have a database and a search engine for performing a search based upon the query. A query processor may receive a query from a query generator and send the query to one or more query systems. Query systems are not uniform or standardized and have varying limitations depending upon the database and the search engine associated with the database. The limitations of various query systems may result in a return of incomplete results by the query system.

SUMMARY

One or more embodiments of the invention include a method, processor and computer program product for receiving an initial query, determining that the initial query causes a query system to identify a maximum number of records deliverable by the query system, and generating a plurality of queries based upon the initial query, each of the plurality of queries causing the query system to identify less than the maximum number of records deliverable by the query system.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
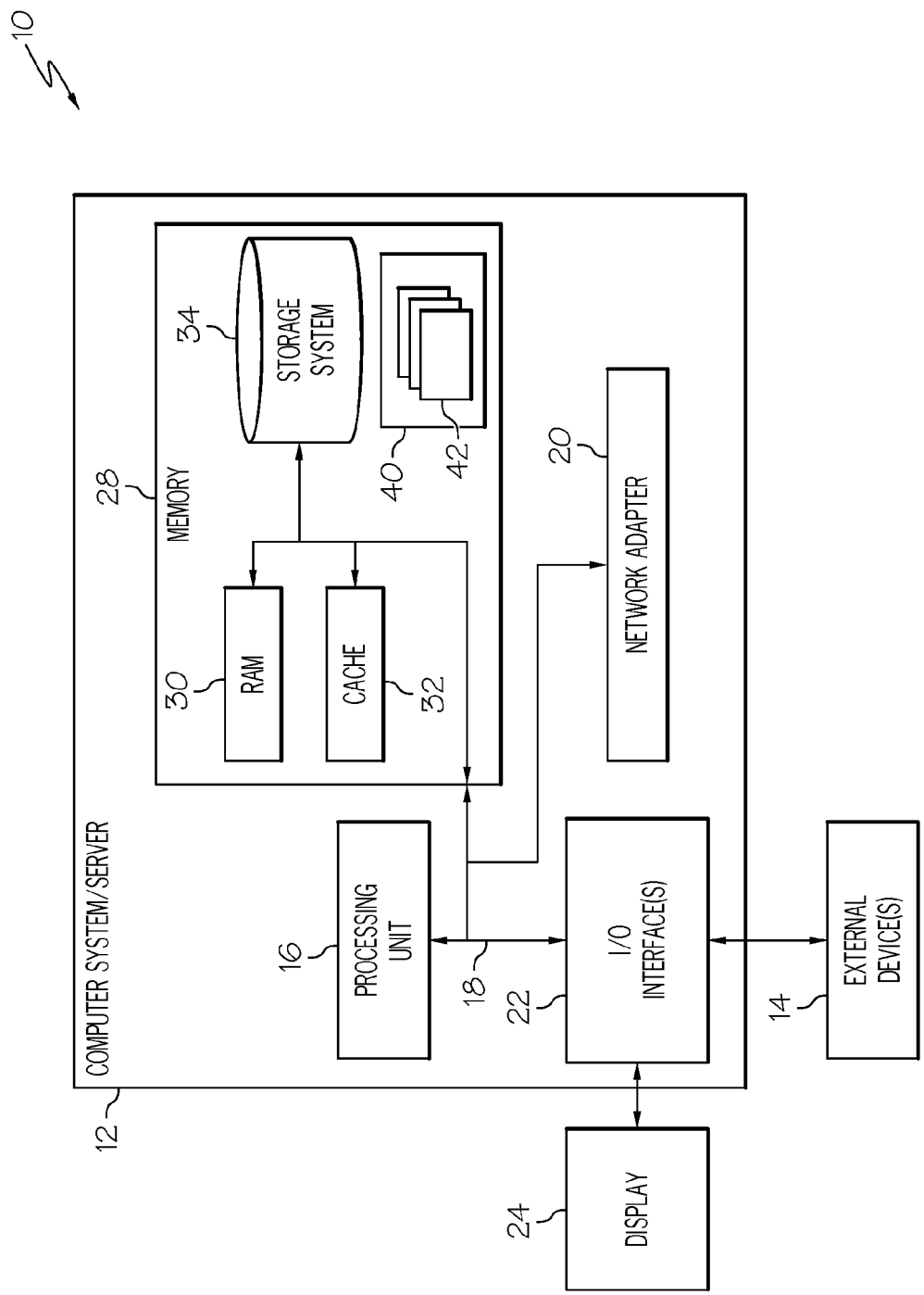
FIG. 1 depicts a cloud computing node according to an embodiment of the present invention.

In the following discussion, details are provided to help thoroughly understand the present disclosure. However, it is apparent to those of ordinary skill in the art that even though there may be no such details, the understanding of the present disclosure would not be influenced. In addition, it should be further appreciated that any specific terms or applications used herein are only for the convenience of description, and thus the present disclosure should not be limited to only use in any specific terms or applications represented and/or implied by such terms.

I. Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
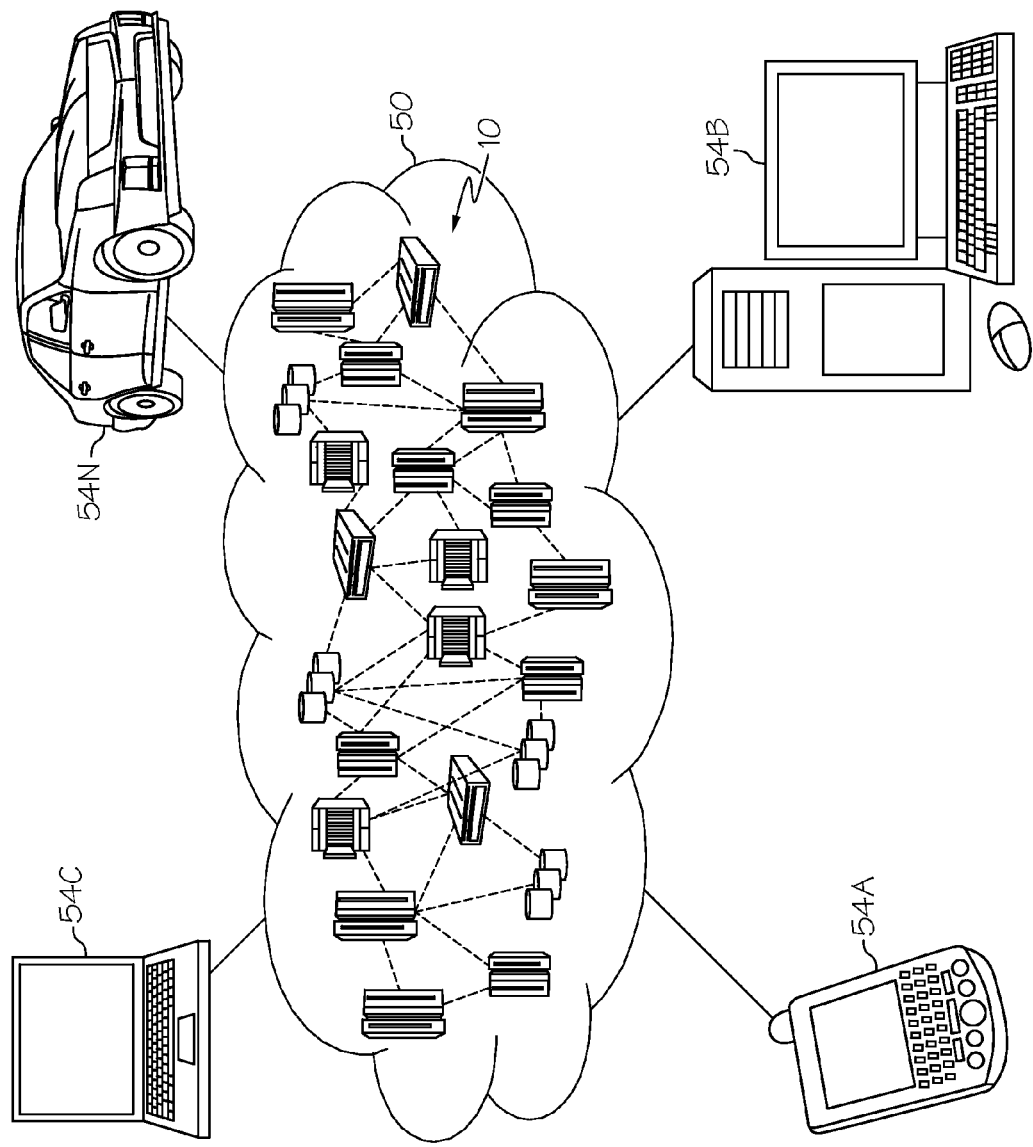
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
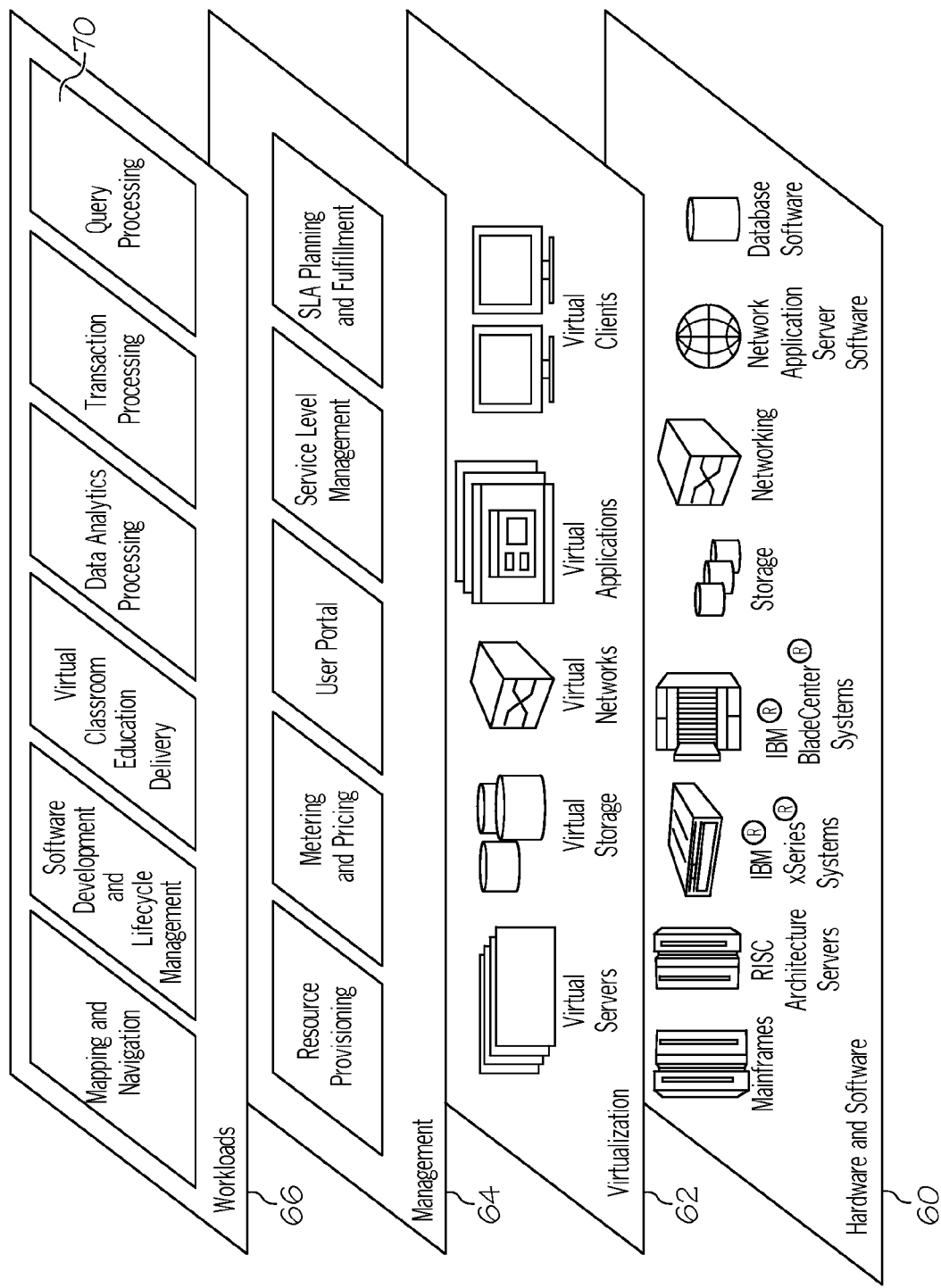
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and query processing 70.

II. Query Processing

The advent of the Cloud computing environment, Big Data and Analytics has led to the integration of many new sources of data, not all of which were initially conceived as data sources with features supporting sophisticated information querying and retrieval. Certain query systems may appears as nodes 10 in the cloud computing environment 50 and provide data available for querying from queries generated by local computing devices 54A-N. But these systems sometimes may not have robust query processing capabilities along the lines of structured databases with mature query and transaction processing languages. For example a query system may have a data store with items that may be queried by a range of key values but may have limitations. Namely, the number of response records returned may have a fixed limit and the respondent records are not sorted. If the query results in more records than the limit and the records are not sorted the requesting client likely will receive an incomplete and random selection of records that meet the query condition but it is not possible for the client to determine if the records constitute a contiguous set or if there are missing records, and if so, which records are missing. If the client assumes the result set is contiguous and issues another query using the highest key value from the previous result set then significant amounts of data may be missing. The inventor has discovered an approach that provides complete search results even though the query system may have the aforesaid limitation by enhancing the operation of the query processor 70.

In operation, the client implements an adaptive query process as follows:

1. The client constructs a query with desired starting and ending key values.

2. The client submits the query and receives a set of result records or a list of key values representing the result records.

3. If the result set has a number of records equal to the result limit then the results are not used. The following steps are repeated until a query result contains a number of records less than the limit a. The ending key value from the previous query is pushed on a stack for later use.

b. A new query is constructed with the same starting key value and a new ending key value computed by finding the median value of the keys found in a sample of the current result set.

c. Submit the new query.

4. When a query result set contain a number of records less than the limit, those records can be processed and the next query constructed using the highest key value from this result set as the starting key value and an ending key value that is popped off the top of the stack. Using this previously computed ending key greatly reduces the overhead in computing key values for subsequent queries.

5. Repeat steps 2 through 4 until no more records are returned.

The computation in step 3b. can be intensive in both computer time and memory space requirements. Computing the median key value from a set of values may be accomplished with at least a partial sorting of those keys. Instead a sample of the keys are selected and sorting algorithm known to be efficient for the data type of the key is used to find the median key value of the sample set. In experiments it has been determined that sampling one record in ten produced a reasonable median value for keys that were substantially uniformly distributed. For keys that tend to form clusters of values, sampling more records may produce better results at modest increase in intensity. In the current implementation it was experimentally found that issuing a query and receiving the count of resulting records is a less intensive operation. Retrieving the key values of the result set also did not add significant computer time. The more intensive operation was in retrieving the data records associated with those result keys. This enhancement allows the query adaption algorithm to be used without a substantial increase in intensity.

Note that if the data store allows multiple records to have the same key value the query algorithm may be enhanced. On each iteration all of the records with a key value that is the same as the highest key value found in a successful query, that is one that retrieved fewer than the limit number of records, are saved. The next query will use this highest key value as the starting key value and may find one or more records that were returned in the previous iteration. Such matches indicate duplicate results which are eliminated. If the data store does not permit duplicate values for the query key then this elimination is not necessary.

Figure 4:
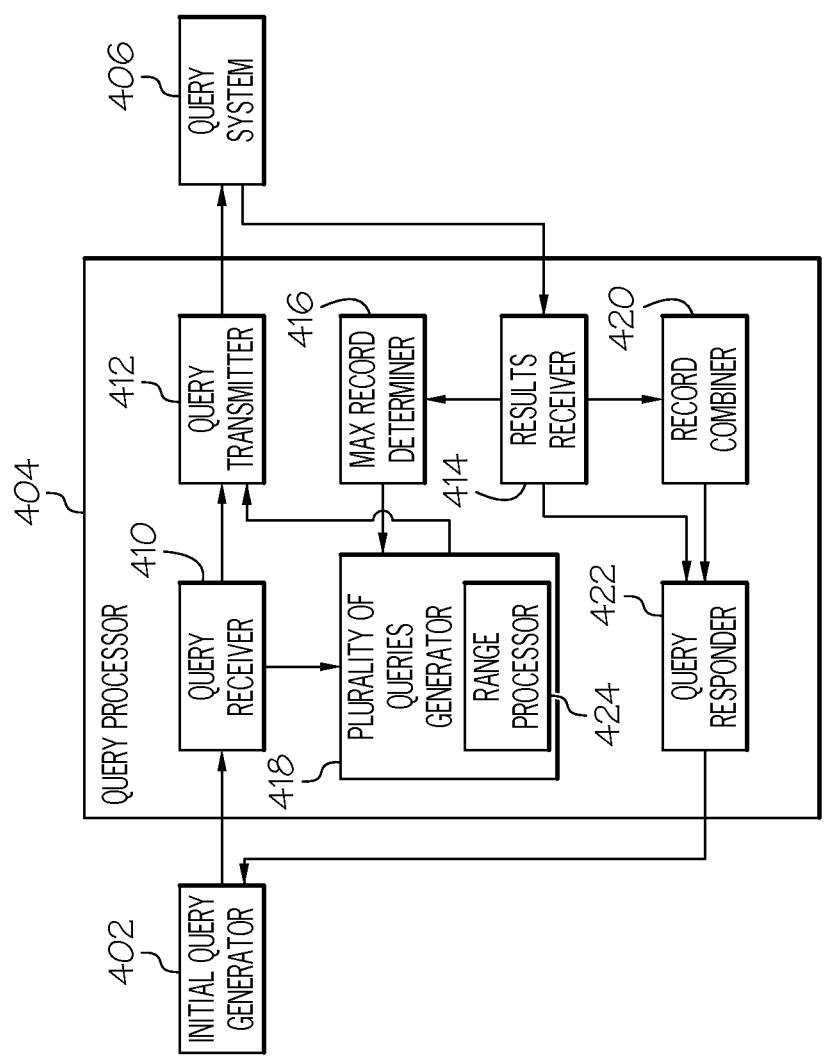
FIG. 4 depicts a block diagram of a query processor for querying query systems with limited capabilities.

FIG. 4 depicts a block diagram of a query processor for querying query systems with limited capabilities. Client queries are received from an initial query generator 402 which may correspond to any of the local computing devices 54A-N of FIG. 2. An initial query is received by query processor 404 which in one example may correspond to cloud based query process 70 of FIG. 3. In other examples the query processor may exist in other places such as a query extension operating on local computing devices 54A-N, or operate on another network node 10, including query system 406. Query system 406 includes a data store or a database and a search engine and may be one of several query systems coupled to query processor 404.

The query processor 404 comprises a query receiver 410 receiving an initial query from the initial query generator 402 and a query transmitter 412 coupled to the query system 406. In this example, the query system has a maximum number of records deliverable by the query system. The query transmitter transmits at least one query from the query processor 404 to the query system 406. The query processor also includes a results receiver 414 that receives at least one query result from the query system. The result includes a number of records identified by the query. A maximum record determiner 416 determines if the initial query causes the query system to identify the maximum number of records identifiable by the query system. In this case, the results of the query will be not be used for the aforementioned reasons.

In the event that a query result is received identifying the maximum number of records, a plurality of queries generator 418 generates a plurality of queries based upon the initial query. Each of the plurality of queries generated causes the query system to identify less than the maximum number of records deliverable by the query system. If one of the plurality of queries generated returns query results equal to the maximum number of records, those result are not used. The plurality of queries are generated to correspond to the scope or range of the initial query. A record combiner 420 combines records identified by the plurality of queries into combined records. The record combiner may also eliminate duplicate records from the combined records resulting from any overlapping scope of each of the plurality of queries. A query responder 422 is coupled to the initial query generator, the query responder transmits a response to the initial query. Depending upon the initial query, the response may comprise either records of the initial query based on the initial query causing the query system to identify less than the maximum number of records, or the combined records based on the initial query causing the query system to identify the maximum number of records. The response may include either the identification of the records or retrieve the records from the corresponding database corresponding to the identification.

In one example the initial query may have an initial range defined by a parameter such as a time stamp having a starting key value and an ending key value. In this example, the plurality of queries generator may further comprise a range processor 424 adapted to determine the initial range and generate each of the plurality of queries with a range less than the initial range, wherein a combined range of each range of the plurality of queries corresponds to the initial range. In this example the scope of the initial query include records between January and December. If more than the maximum number of records deliverable by the query system, then the range processor 424 may cause the plurality of queries generator 418 to generate two queries, a first having a range of January to April, and the second having a range of April to December based on the result of the initial query having an uneven or clustered distribution. In this example, April may correspond to the median value and the first and second queries have reduced ranges that cause the query system to deliver less than the maximum number of records deliverable by the query system for each of the plurality of queries. Thus the range of the first and second queries, when combined, correspond to the range of the initial query. Furthermore, since the range of both the first and the second queries include the month of April there is an overlap of ranges and duplicate records may be delivered by both queries. In response, the record combiner 420 eliminates duplicate records from the combined records resulting from the plurality of queries. While in this example, it may not be necessary to have overlapping ranges, such as the month of April, in two queries, in other example ranges, such an overlap by be beneficial, including simplification in determining the starting key value and ending key value each of the plurality of queries. For example, one of the plurality of queries has a first range having a first starting key value and a first ending key value and another of the plurality of queries has a second range having a second starting key value and a second ending key value, the first ending key value being equivalent to the second starting key value. Thus, an offset or incremental difference between the first ending key value and second starting key value need not be determined.

Figure 5:
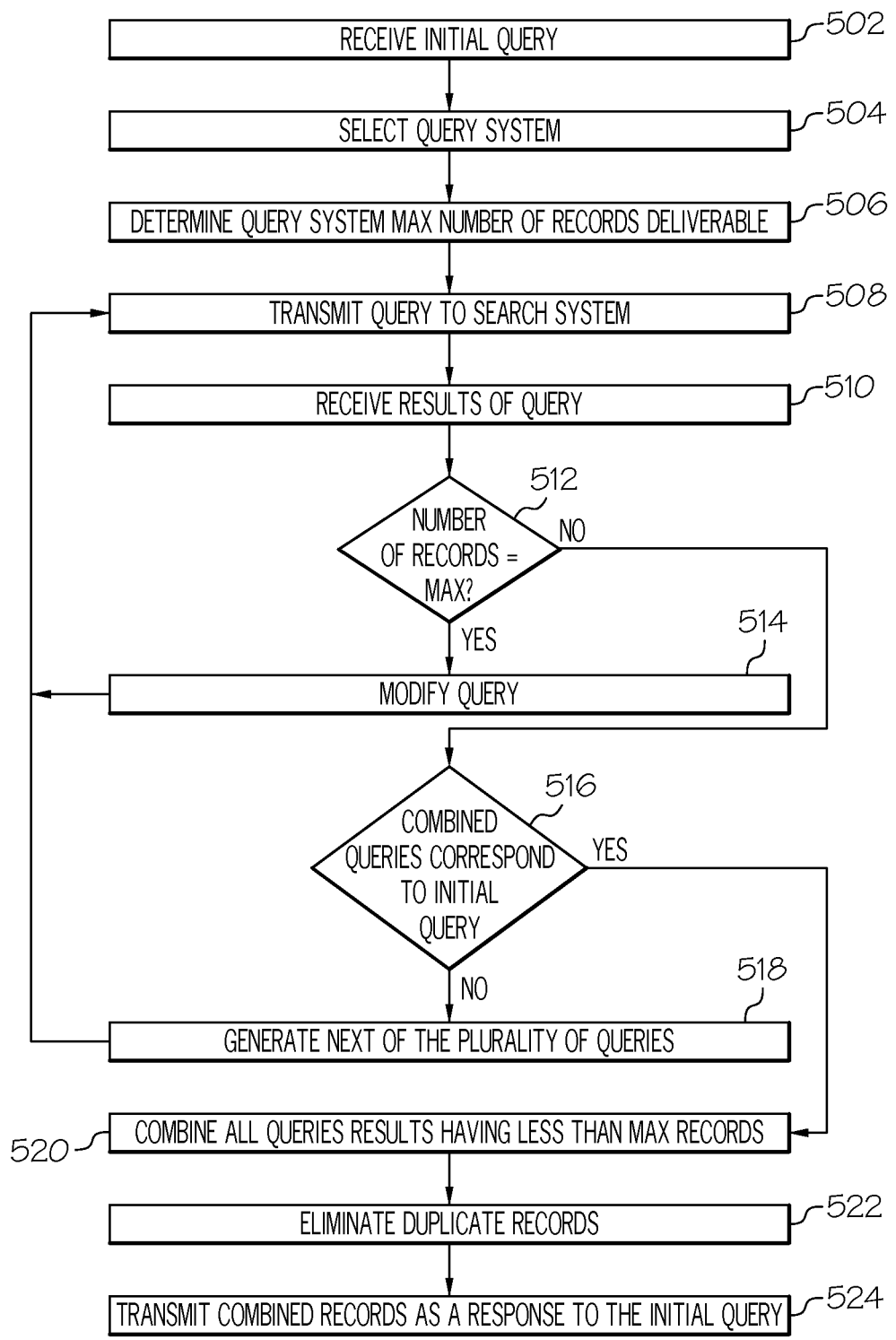
FIG. 5 depicts an example flow diagram of a process operating in a query processor for querying systems with limited capabilities.

FIG. 5 depicts an example flow diagram of a process operating in a query processor for querying systems with limited capabilities. An initial query is received at step 502, and step 504 selects at least one of a plurality of query systems based upon the initial query. Then step 506 determines if a selected query system has a maximum number of deliverable records. This determination may be made by querying the query system and storing the limitation of the query system, or the determination may be recalled from memory, or may be determined by multiple queries. For example the results of an initial query having a first range may return a first number of records. Based on the returned records, the range may be reduce to produce one or more less records and a query of the reduced range submitted to the query system. If the same number or records are identified by the reduced range query, then the query system has a maximum number or records corresponding to the number of records returned. Any method of determining if a query system has a maximum number or records deliverable by the query system is within the scope of this disclosure.

Step 508 then transmits the query to the query system and step 510 receives the results of the query. Step 512 determines if the results includes the maximum number of records deliverable by the query system. If so then the query is modified at step 514 and transmitted at step 508. Any type of query modification is included within the scope of this description. An above example showed modification of a query having a range corresponding to a time stamp. Examples of other modifications include ranges corresponding to alphabetical sequences, price sequences, location based sequences and other parameters known to those familiar with the art.

If the number of records returned is less than the maximum at step 512, then step 516 determines if the combined queries have results less than the maximum number of results deliverable by the query system correspond to the initial query. For example if a query has a time stamp range, do the combined time stamp ranges of the plurality of queries correspond to the time stamp range of the initial query? If not, then a next of the plurality of queries is generated at step 518 and transmitted to the query system at step 508.

If the combined plurality of queries correspond to the initial query at step 516, then step 520 combines the results of the plurality of queries returning less than the maximum number of deliverable records of the query system and step 522 eliminates duplicate records that may be the result of overlapping scopes of the plurality of queries. Note that in another example, step 522 may be performed after each acceptable query of the plurality of queries. Then step 534 transmits the combined records to the search generator as a response to the initial search.

The process of FIG. 5 has the advantage of providing a complete response to an initial query even if the initial query results in a number of records that exceeds the maximum number of records deliverable by the query system. This is achieved by determining that the initial query causes a query system to identify a maximum number of records deliverable by the query system, and generating a plurality of queries based upon the initial query, each of the plurality of queries causing the query system to identify less than the maximum number of records deliverable by the query system, combining records identified by the plurality of queries into combined records; and transmitting the combined records as a response to the initial query.

The process of FIG. 5 may result in an iterative or adaptive process in generating a query that does not cause the query system to identify the maximum number of records deliverable by the query system as evidenced by repeated execution of steps 508-514 until the number of records is less than the maximum at step 512, thereby contributing to the adaptive nature of the process of the present description. For example, the plurality of queries may generate a first query having a first range less than the initial range, and the record combiner combines records identified by the first query based upon the first query causing the query system to identify less than the maximum number of records deliverable by the query system. However, if the first query causes the query system to generate the maximum number of records deliverable by the query system, then a subsequent execution of steps 508-514 generates a second query having a second range less than the first range based upon the first query causing the query system to identify the maximum number of records deliverable by the query system, in which case the combining of step 516 does not combine records identified by the first query and does combine records identified by the second query based upon the second query causing the query system to identify less than the maximum number of records deliverable by the query system. Thus, results of queries returning the maximum number of records deliverable by the query system are not combined and results of queries returning less than the maximum number of records deliverable by the query system are combined.

The process of FIG. 5 does not require every initial query to result in the generation of a plurality of queries. In one example, the query processor may receive another query, such as a new initial query for query generator 402, determine that the other query causes the query system to identify less than the maximum number of records deliverable by the query system at step 512 and transmit records identified by the other query as a response to the other query at step 524. In this example, step 514 is not executed and the execution of step 520 and 522 referring to query result combining and elimination record duplications are optional because a plurality of queries need not be generated.

Figure 6:
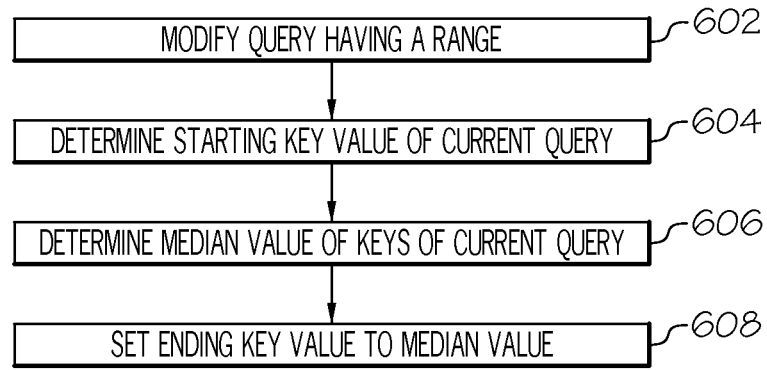
FIG. 6 depicts an example flow diagram of a process for modifying a query having a range.

FIG. 6 depicts an example flow diagram of a process for modifying a query having a range. Step 602 corresponds to step 514 of FIG. 5 and provides a more detailed description of modifying a query having a range. Step 604 determines the starting key value of the current query and step 606 determines the median key value of keys of the current query. Then step 608 sets the ending key value of the modified query to the median key value. This has the intended effect of generating a new query having a range that is reduced by half of the current query. This step is executed because the current query returned the maximum number of records deliverable by the query system. The actual number of records corresponding to the current query is unknown and may be slightly more than the query system's maximum or may be significantly more than the query system's maximum number of deliverable records. Furthermore, the median value is determined from the key values of the identified records, which does not include all of the records in the range of the current query.

Figure 7:
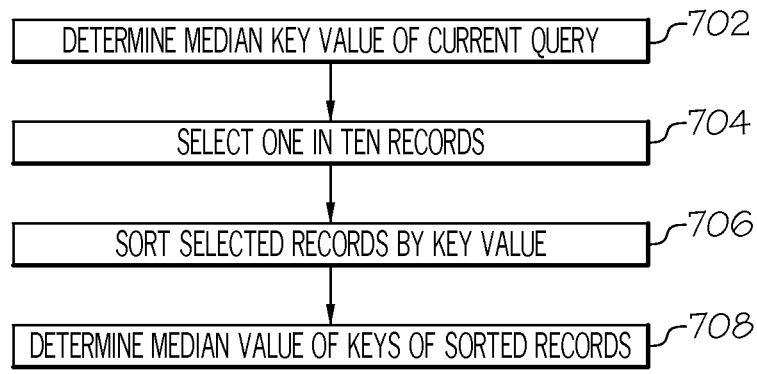
FIG. 7 depicts an example flow diagram of a process for determining a median key value of a current query.

FIG. 7 depicts an example flow diagram of a process for determining a median key value of a current query. Step 702 provides a more detail process of step 606 of FIG. 6. Step 704 selects a fraction of the identified records, in this example one in ten records, and step 706 sorts the selected records by key value. Then step 708 determines the median value of the sorted records by determining the midpoint of the sorted records in a manner known to those familiar with the art. Experiments has shown that this approach is an efficient approach at determining a median value in that it finds a representative median value with reduced intensive processing of the computer system calculating the median value.

While the process described above shows generating a plurality of queries based on an initial query and median values of query results, other approaches may be utilized for generating the plurality of queries while remaining within the scope of the description. For example, a new query can be generated by arbitrarily reducing the range of a previous query by a set amount, such as half. In another example, the magnitude of a range of a subsequent query may be set to the magnitude of the range of a previous query that resulted in query system identifying less than the maximum number of records deliverable by the query system. In another example, if the database has a known characteristic distribution, for example it may be known that more records exist within a first time range than in a second time range, then the range of the plurality of queries may be adjusted in response to the distribution. Also, the results of the adaptive process of a previous initial query can be applied to a new initial query in the generation of the plurality of queries.

III. Computer Program Process

The methods described herein may be implemented in a computer program product for processing a query, the computer program product comprising a computer readable storage medium having program instructions embodied therewith. The program instructions may be executable by a computer system to cause the computer system to perform the method.

The respective implementations of the present disclosure can be carried out in any appropriate mode, including hardware, software or firmware stored on a storage media and executed computer storage program product, or combination thereof. Alternatively, it is possible to at least partially carry out the implementation of the present disclosure as computer software executed on one or more data processors and/or a digital signal processor. The components and modules or processes of the implementation of the present disclosure can be implemented physically, functionally and logically in any suitable manner. Indeed, the function can be realized in a single member or in a plurality of members, or as a part of other functional members. Thus, it is possible to implement the implementation of the present disclosure in a single member or distribute it physically and functionally between different members and a processor.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations, flow diagrams and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the computer or other programmable data processing apparatus, create means for implementing the functions/acts specified in the blocks of the flowchart illustrations and/or block diagrams.

These computer program instructions may also be stored in a computer readable medium that can direct a computer or other programmable data processing apparatus to function in a particular manner, such that the instructions stored in the computer readable medium produce an article of manufacture including instruction means which implement the functions/acts specified in the blocks of the flowchart illustrations and/or block diagrams.

The computer program instructions may also be loaded onto a computer or other programmable data processing apparatus to cause a series of operational steps to be performed on the computer or other programmable data processing apparatus to produce a computer implemented process such that the instructions which execute on the computer or other programmable apparatus provide processes for implementing the functions/acts specified in the blocks of the flowchart illustrations and/or block diagrams.

The present disclosure is described by use of detailed illustration of the implementations of the present disclosure, and these implementations are provided as examples and do not intend to limit the scope of the present disclosure. Although these implementations are described in the present disclosure, modifications and variations on these implementations will be apparent to those of ordinary skill in the art. Therefore, the above illustration of the exemplary implementations does not confine or restrict the present disclosure. Other changes, substitutions and modifications are also possible, without departing from the scope of the description and the appended claims.

What is claimed is:

1. A computer program product for processing a query, the computer program product comprising a computer readable storage medium having program instructions embodied therewith, the program instructions executable by a computer system to cause the computer system to perform a method comprising:
   receiving an initial query with an initial range;
   determining that the initial query causes a query system to identify a maximum number of records deliverable by the query system;
   generating a plurality of queries based upon the initial query, each of the plurality of queries causing the query system to identify less than the maximum number of records deliverable by the query system, each of the plurality of queries has a range less than the initial range, and the generating generates a first query having a first range less than the initial range;
   combining records identified by the plurality of queries into combined records and the combining combines records identified by the first query based upon the first query causing the query system to identify less than the maximum number of records deliverable by the query system;
   transmitting the combined records as a response to the initial query;
   wherein the generating generates a second query having a second range less than the first range based upon the first query causing the query system to identify the maximum number of records deliverable by the query system, and the combining does not combine records identified by the first query and combines records identified by the second query based upon the second query causing the query system to identify less than the maximum number of records deliverable by the query system.

2. The computer program product according to claim 1 wherein the first range has a first starting key value and a first ending key value, the generating generates a second query having a second starting key value and a second ending key value, the second starting key value being equivalent to the first ending key value, the combining combines records identified by the first query and the second query based upon the second query causing the query system to identify less than the maximum number of records deliverable by the query system and eliminates duplicate records based upon the second starting key value being equivalent to the first ending key value, and the programming instructions are provided as a service in a cloud computing environment.

3. The method according to claim 1 further comprising:
receiving another query;
determining that the other query causes the query system to identify less than the maximum number of records deliverable by the query system; and
transmitting records identified by the other query as a response to the other query.

4. A computer program product for processing a query, the computer program product comprising a computer readable storage medium having program instructions embodied therewith, the program instructions executable by a computer system to cause the computer system to perform a method comprising:

receiving an initial query with an initial range;
determining that the initial query causes a query system to identify a maximum number of records deliverable by the query system, each of the plurality of queries has a range less than the initial range and the generating generates a first query having a first range less than the initial range;
generating a plurality of queries based upon the initial query, each of the plurality of queries causing the query system to identify less than the maximum number of records deliverable by the query system, each of the plurality of queries has a range less than the initial range, and the generating generates a first query having a first range less than the initial range;
combining records identified by the plurality of queries into combined records, the combining combines records identified by the first query based upon the first query causing the query system to identify less than the maximum number of records deliverable by the query system;
transmitting the combined records as a response to the initial query;
wherein
the initial range is based upon a starting key value and an ending key value and the method further comprises
determining a median key value based upon records identified by the initial query, and further wherein the first range is based upon the starting key value and the median key value, and further wherein a fraction of the records identified by the initial query are sampled in determining the median key value, the fraction corresponding to one in ten the records identified by the initial query.

5. The computer program product according to claim 4 wherein the first range has a first starting key value and a first ending key value, the generating generates a second query having a second starting key value and a second ending key value, the second starting key value being equivalent to the first ending key value, the combining combines records identified by the first query and the second query based upon the second query causing the query system to identify less than the maximum number of records deliverable by the query system and eliminates duplicate records based upon the second starting key value being equivalent to the first ending key value, and the programming instructions are provided as a service in a cloud computing environment.

6. The method according to claim 4 further comprising:
receiving another query;
determining that the other query causes the query system to identify less than the maximum number of records deliverable by the query system; and
transmitting records identified by the other query as a response to the other query.

7. A system for processing a query, the system comprising:
a memory;
a processor communicatively coupled to the memory, where the processor is configured to perform
receiving an initial query with an initial range;
determining that the initial query causes a query system to identify a maximum number of records deliverable by the query system;
generating a plurality of queries based upon the initial query, each of the plurality of queries causing the query system to identify less than the maximum number of records deliverable by the query system, each of the plurality of queries has a range less than the initial range, and the generating generates a first query having a first range less than the initial range;
combining records identified by the plurality of queries into combined records and the combining combines records identified by the first query based upon the first query causing the query system to identify less than the maximum number of records deliverable by the query system;
transmitting the combined records as a response to the initial query;
wherein
the generating generates a second query having a second range less than the first range based upon the first query causing the query system to identify the maximum number of records deliverable by the query system, and
the combining does not combine records identified by the first query and combines records identified by the second query based upon the second query causing the query system to identify less than the maximum number of records deliverable by the query system.

8. The system according to claim 7 wherein
the first range has a first starting key value and a first ending key value, the generating generates a second query having a second starting key value and a second ending key value, the second starting key value being equivalent to the first ending key value, the combining combines records identified by the first query and the second query based upon the second query causing the query system to identify less than the maximum number of records deliverable by the query system and eliminates duplicate records based upon the second starting key value being equivalent to the first ending key value.

9. The system according to claim 7 further comprising:

receiving another query;

determining that the other query causes the query system to identify less than the maximum number of records deliverable by the query system; and transmitting records identified by the other query as a response to the other query.

\* \* \* \* \*